「United States Patent」 [19]
Wu et al.

[10] Patent No.: US 6,950,163 B2
[45] Date of Patent: Sep. 27, 2005

(54) LCD PANEL WITH COMMON VOLTAGE ADJUSTER

(75) Inventors: Chi-Fu Wu, Miaoli (TW); Po-Tang Hsu, Taipei (TW)

(73) Assignee: Au Optronics Corp., Hsinchu (TW)

( * ) Notice: Subject to any disclaimer, the term of this patent is extended or adjusted under 35 U.S.C. 154(b) by 73 days.

(21) Appl. No.: 10/621,427

(22) Filed: Jul. 16, 2003

(65) Prior Publication Data

US 2005/0012874 A1 Jan. 20, 2005

(51) Int. Cl.[7] ............................................... G02F 1/133
(52) U.S. Cl. ........................ 349/139; 349/38; 349/149
(58) Field of Search ............................. 349/33, 34, 37, 349/38, 58, 139, 149; 345/96

(56) References Cited

U.S. PATENT DOCUMENTS

2001/0005240 A1 * 6/2001 Takeishi ...................... 349/58
2003/0117565 A1 * 6/2003 Suh ............................ 349/149

FOREIGN PATENT DOCUMENTS

| JP | 9-34381 | * | 2/1997 |
| JP | 2000-267618 | * | 9/2000 |

* cited by examiner

Primary Examiner—Dung T. Nguyen
Assistant Examiner—Tai Duong
(74) Attorney, Agent, or Firm—Ladas & Parry LLP

(57) ABSTRACT

An LCD panel having a common electrode and a sliding adjustment disposed thereon. The sliding adjustment is connected to the common electrode and has a guiding groove and a sliding piece therein. The sliding piece can be shifted in the guiding groove to change the common voltage of the common electrode, unifying the illumination of the LCD panel.

8 Claims, 3 Drawing Sheets

4 # LCD PANEL WITH COMMON VOLTAGE ADJUSTER

BACKGROUND OF THE INVENTION

1. Field of the Invention

The present invention relates to an LCD panel, and in particular to an LCD having a common voltage adjustment.

2. Description of the Related Art

FIG. 1A is an equivalent circuit diagram of a pixel 10 of the conventional TFT-LCD. In FIG. 1A, the circuit of each pixel has a data line (DL), bit line (BL), thin film transistor (M), compensation capacitor (C) and equivalent capacitor (Lc). The data line (DL) is connected to the source terminal (S) of the thin film transistor (M). The bit line (BL) is connected to the gate terminal (G). The equivalent capacitor (Lc) produced by the liquid crystal in the LCD panel and the compensation capacitor (C) are disposed between the drain terminal (D) and the ground terminal.

FIG. 1B is an output waveform of the conventional TFT-LCD. $V_{DL}$ represents the voltage of the data line (DL). $V_{BL}$ represents the voltage of the bit line (BL). $V_c$ is the average voltage of the data line (DL). $V_{com}$ is the voltage of the ground terminal. $V_o$ is the voltage over the equivalent capacitor (Lc). Moreover, $T_1$ is the selected period, and $T_2$ is the non-selected period of the bit line (BL).

Referring to FIGS. 1A and 1B, during the selected period ($T_1$), $V_{BL}$ is high, and the gate terminal (G) of the thin film transistor (M) is in forward-active mode, such that the voltage ($V_o$) over the equivalent capacitor (Lc) is equal to the voltage ($V_{DL}$) of the data line. At the time when $V_{BL}$ becomes low, the gate terminal (G) is cutoff. The voltage ($V_o$) drops by $\Delta V$ immediately because of the parasitic capacitor between the gate terminal (G) and the drain terminal (D) of the thin film transistor (M). Further, the voltage $V_o$ decays within the non-selected period ($T_2$) because of the current leakage. After $V_{BL}$ becomes high again, the equivalent capacitor (Lc) are re-charged.

Because the voltage drop $\Delta V$ has no relationship with the direction of the data line voltage ($V_{DL}$), the output voltage ($V_o$) always drops a voltage by $\Delta V$, which depends on the fabricating conditions of the thin film transistor (M). Therefore, the output voltage ($V_o$) is not symmetrical. The TFT-LCD panel may flash, and the illumination of the image is unstable.

SUMMARY OF THE INVENTION

Accordingly, an object of the present invention is to provide a LCD panel with a adjustment to shift the output voltage acting on the liquid crystal, such that the illumination of the LCD panel becomes more uniform and stable.

The present invention provides an LCD panel having a common electrode and a sliding adjustment disposed thereon. The sliding adjustment is connected to the common electrode and has a guiding groove and a sliding piece therein. The sliding piece can be shifted in the guiding groove to change the common voltage of the common electrode, unifying the illumination of the LCD panel.

In a preferred embodiment of the present invention, the LCD panel has a ground terminal, and the sliding adjustment is disposed between the common electrode and the ground point. Each pixel of the LCD panel has a compensation capacitor connected to the common electrode. The sliding adjustment is a sliding variable resistor, which is to change the resistance between the common electrode and the ground terminal, unifying the illumination of the LCD panel.

The present invention also provides another embodiment. An LCD panel has a sliding adjustment disposed thereon. The sliding adjustment has a guiding groove and a sliding piece therein. The sliding piece can be shifted in the guiding groove to change a resistance acting on the LCD panel.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
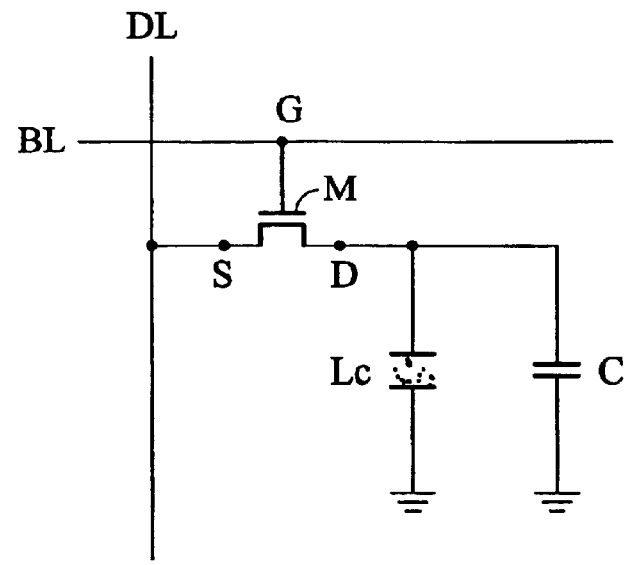
FIG. 1A is an equivalent circuit diagram of a pixel of the conventional TFT-LCD.
Figure 1B:
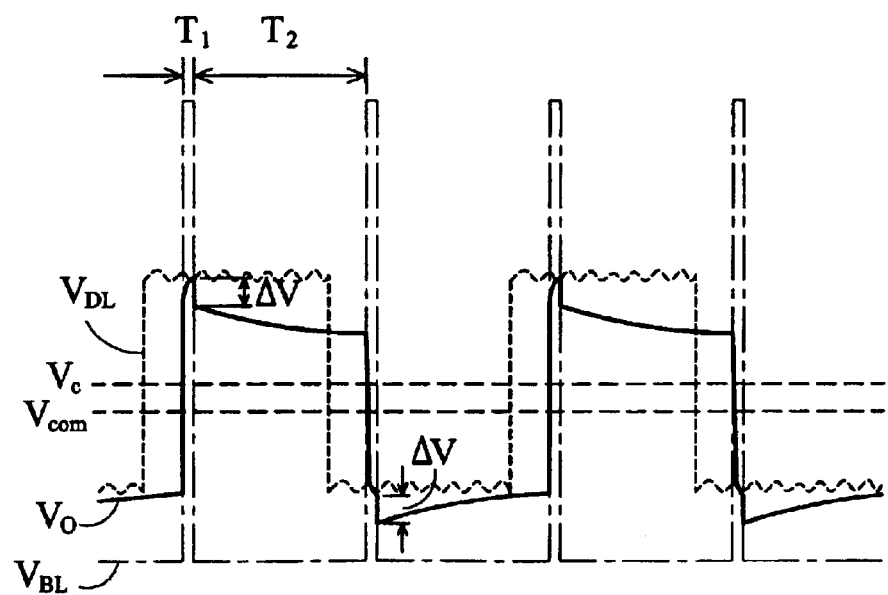
FIG. 1B is an output waveform of the conventional TFT-LCD.
Figure 2A:
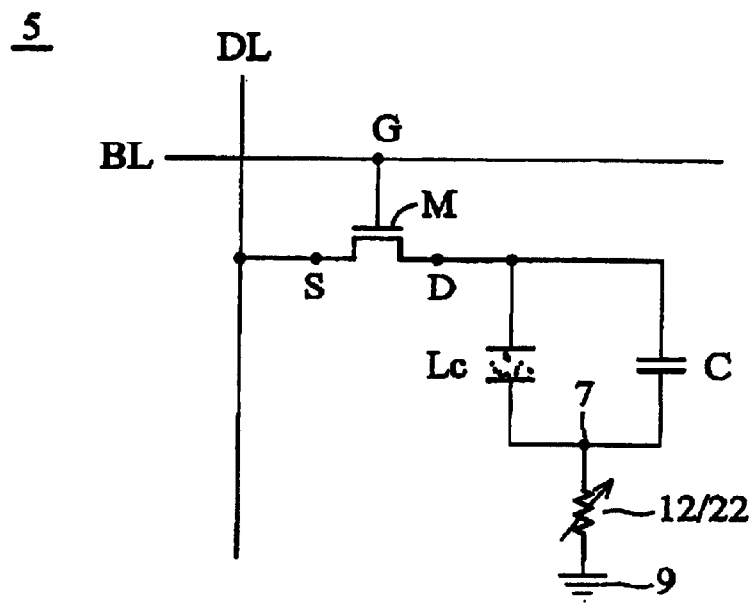
FIG. 2A is an equivalent circuit diagram of the present invention.

FIG. 2A is an equivalent circuit diagram of the present invention. In order to stabilize the illumination of the LCD panel, each pixel of the LCD panel is connected to a common electrode 7. A variable resistor 12/22 is electrically connected to the common electrode 7 and the ground terminal 9 of the LCD panel. The voltage of the common electrode $V_{com}$ is tunable to approach the average voltage ($V_c$) of the data line (DL), such that the waveform of $V_o$ is more symmetric.

Figure 2B:
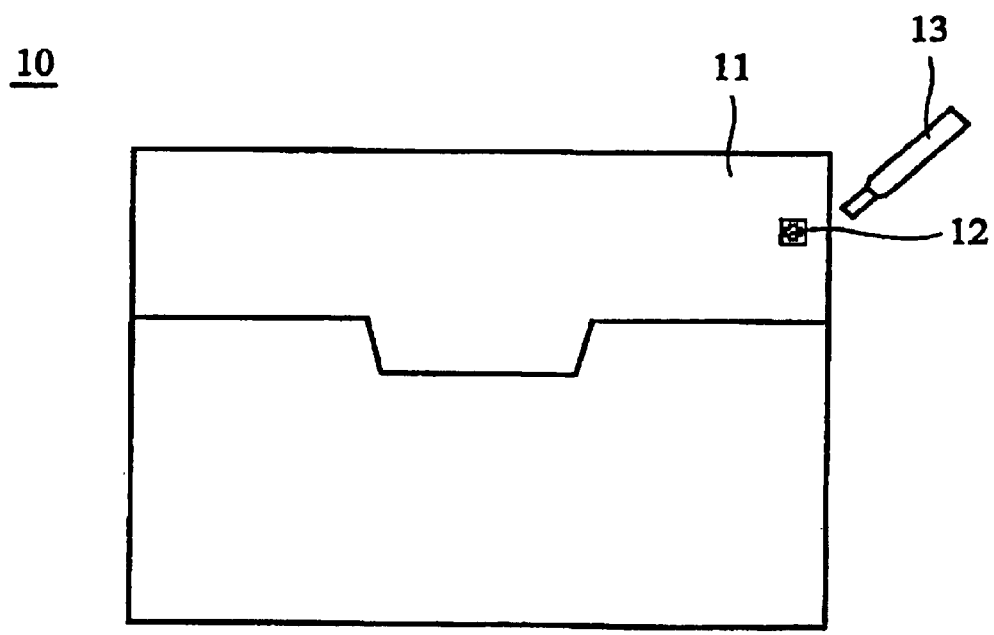
FIG. 2B is a schematic view of a LCD panel of the invention.

FIG. 2B is a schematic view of a LCD panel of the invention. In FIG. 2B, a variable resistor 12 is disposed on the backside print circuit board 11 (PCB) of a TFT-LCD panel 10. A variable resistor 12 is electrically connected to a common electrode of each pixel and the ground terminal of the TFT-LCD panel 10. The variable resistor 12 can be tuned by a tool 13 when the panel 10 is finished and ready to leave the factory. The common voltage of each panel can be individually tuned, such that the illumination is optimized.

Figure 3A:
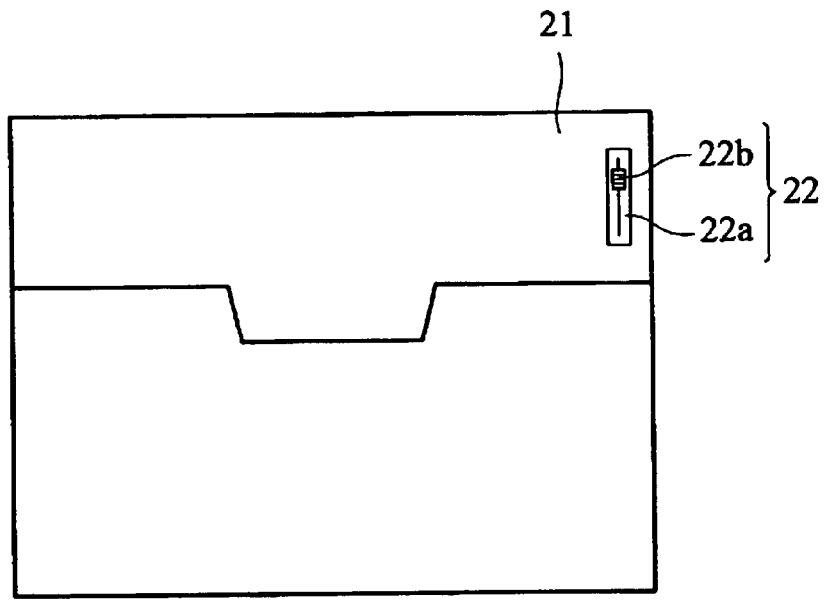
FIG. 3A is a schematic view of a LCD panel of another embodiment.

However, it is sometimes not convenient to use the specific tool 13 to tune the variable resistor 12 used in FIG. 2B. The present invention provide another embodiment shown in FIG. 3A. In FIG. 3A, the TFT-LCD panel 20 includes a plurality of pixels as shown in FIG. 2A. The equivalent capacitor (Lc) and the compensation capacitor (C) are connected to a common electrode 7. A sliding variable resistor 22 is electrically connected to a common electrode 7 of each pixel and the ground terminal 9 of the TFT-LCD panel 10 to change the common voltage ($V_{com}$). In FIG. 3A, the sliding variable resistor 22 is disposed on the backside PCB 21 of a TFT-LCD panel 20. The sliding variable resistor 22 has a guiding groove 22a and a sliding piece 22b disposed therein. The sliding piece 22b can be shifted in the guiding groove 22a along a path on a surface of the TFT-LCD panel 20 to change the common voltage ($V_{com}$) of the common electrode 7, unifying the illumination of the TFT-LCD panel 20. The sliding variable resistor 22 can be tuned simply by fingers, which saves the calibration time.

Figure 3B:
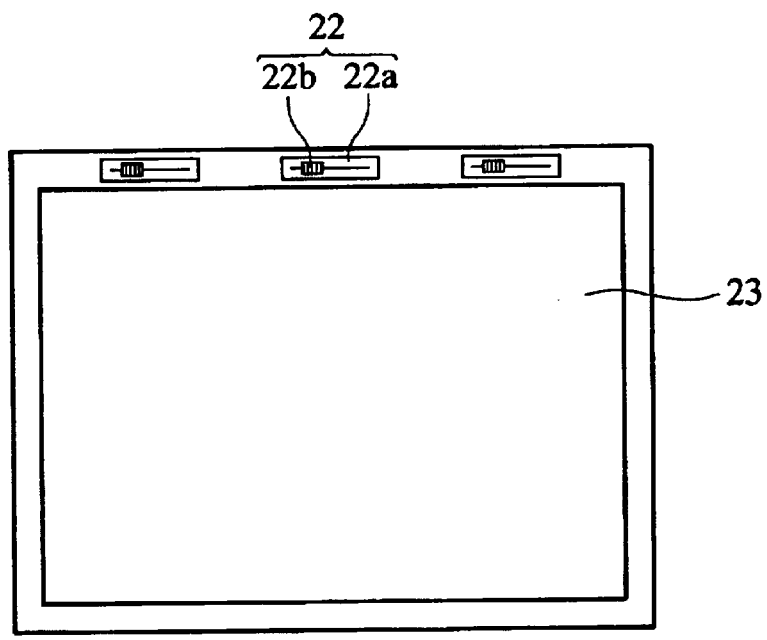
FIG. 3B is a front view of a LCD panel of another embodiment.

Furthermore, variable resistors can be adjustments of some display conditions of a TFT-LCD panel 20. In FIG. 3B, the sliding variable resistors 22 are disposed above the display area 23 or other positions. The sliding pieces 22b are horizontally shifted in the guiding groove 22a along paths on the surface of the TFT-LCD panel 20 to change the acting resistance of the variable resistors, such that the display conditions of a TFT-LCD panel 10 can be easily optimized.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LCD panel, comprising:

a main body; and a sliding adjustment disposed on the main body and having a guiding groove and a sliding piece therein, the sliding piece being horizontally shifted in the guiding groove along a path on a surface of the LCD panel to change a resistance acting on the main body.

2. An LCD panel, comprising:

a main body; and at least two sliding adjustments disposed on the main body and each having a guiding groove and a sliding piece therein, each of the sliding pieces being horizontally shifted in the corresponding guiding groove along a path on a surface of the LCD panel to change a respective resistance acting on the main body.

3. An LCD panel, comprising:

a main body having a common electrode; and a sliding adjustment disposed on the main body connected to the common electrode and having a guiding groove and a sliding piece therein, the sliding piece being horizontally shifted in the guiding groove along a path on a surface of the LCD panel to change the common voltage of the common electrode.

4. The LCD panel as claimed in claim 1, wherein the main body has a ground terminal, and the sliding adjustment is electrically disposed between the common electrode and the ground terminal.

5. The LCD panel as claimed in claim 1, wherein the main body has a plurality of pixels connected to the common electrode.

6. The LCD panel as claimed in claim 5, wherein each of the pixels has a compensation capacitor connected to the common electrode.

7. The LCD panel as claimed in claim 1, wherein the sliding adjustment is a sliding variable resistor.

8. The LCD panel as claimed in claim 7, wherein the sliding variable resistor changes a resistance between the common electrode and a ground terminal.

* * * * *